Sept. 6, 1966 L. A. KAMENTSKY 3,271,738

OPERATOR ASSISTED CHARACTER READING SYSTEM

Filed Aug. 13, 1963 2 Sheets-Sheet 1

INVENTOR.
LOUIS A. KAMENTSKY

BY Edward G. Fiorito

ATTORNEY

OPERATOR ASSISTED CHARACTER READING SYSTEM

Filed Aug. 13, 1963 2 Sheets-Sheet 2

OPERATOR STATION 4

United States Patent Office 3,271,738

Patented Sept. 6, 1966

3,271,738 OPERATOR ASSISTED CHARACTER READING SYSTEM

Louis A. Kamentsky, Briarcliff Manor, N.Y., assignor to International Business Machines Corporation, New York, N.Y., a corporation of New York Filed Aug. 13, 1963, Ser. No. 301,852
11 Claims. (Cl. 340—146.3)

This invention relates to systems for reading characters, and more particularly to such systems employing operators to assist the system in identifying characters which the system fails to recognize.

At the present time, many character readers cannot successfully read every character presented for recognition. It is usually necessary to have an operator assist the system when it fails to recognize a character. The character reader must notify the operator in some manner that a character has been rejected so that the operator can assist the system.

One manner of notifying the operator that a character cannot be recognized is to stop the system each time this happens. The operator may then observe the last character presented to the system for recognition. After identifying the character the operator by means of a keyboard supplies the system with the correct identification signal. The system may then continue reading characters until the next failure occurs.

One problem with the above described method of assisting the character reader arises where the reader is capable of high speed operation. The delays introduced by the operator seriously hamper the overall speed of operation since the character reader must wait for the operator to identify the character each time a reject occurs.

Accordingly it is an object of the present invention to provide an improved character reading system adapted to receive operator assistance without interrupting the operation of the character reader.

It is a further object of the present invention to provide a continuously operating character reading system adapted to interleave the characters identified by an operator with the characters recognized by the reader so that the output character sequence agrees with the sequence in which the characters were originally presented for recognition.

Another object of the present invention is to provide a continuously operating character reading system adapted to receive assistance from a plurality of operators.

An additional object of the present invention is to provide a continuously operating character reading system adapted to receive assistance from a plurality of operators wherein the workload is distributed among the operators so that a minimum number of operators is necessary to assist the character reader.

It is another object of the present invention to provide a continuously operating character reading system adapted to receive assistance from a team of operators wherein member operators may leave or join the team without disrupting the continuous operation of the character reader and wherein the workload distribution is automatically adjusted to compensate for the variation in the number of operators.

These and other objects are accomplished in accordance with the broad aspects of the present invention by providing a character reading system which addresses each character presented for recognition. If the character is recognized the identification signal is placed into a buffer storage at a memory location determined by the address assigned to the character. If the character is not recognized the address of the rejected character is sent to an operator station which stores the address. The character reader proceeds to operate upon the next character presented for recognition without interruption. Meanwhile, the operator observes the rejected character and supplies the proper identification signal to the buffer storage. The rejected character identification signal provided by the operator is stored at a memory location determined by the address stored in the operator station. In this manner the character identification signal from the operator station is interleaved with the character identification signal from the character reader at the proper location so that when the buffer storage is read out the characters appear in the sequence in which they were originally presented to the character reader.

In accordance with a more detailed aspect of the present invention a plurality of operators is provided to assist the character reader. Each operator is given an identification number which is supplied to an operator selector when the operator completes an assignment. The operator selector stores the operator numbers and distributes the workload on a first-in first-out basis. That is the oldest operator number stored in the selector is given the next assignment. In this manner the maximum amount of time between assignments is allowed for each operator.

An advantage of the present invention is that the character reader is permitted to continue operating without interruption due to the assisting operators.

Another advantage of the present invention employing a plurality of operators is that the character reader can operate continuously even though many characters are rejected during an interval of time required for a single operator to identify only one rejected character.

Still another advantage of the present invention is the rapid rate at which the final output is assembled in the proper sequence.

The foregoing and other objects, features and advantages of the invention will be apparent from the following more particular description of a preferred embodiment of the invention, as illustrated in the accompanying drawings.

Figure 1:
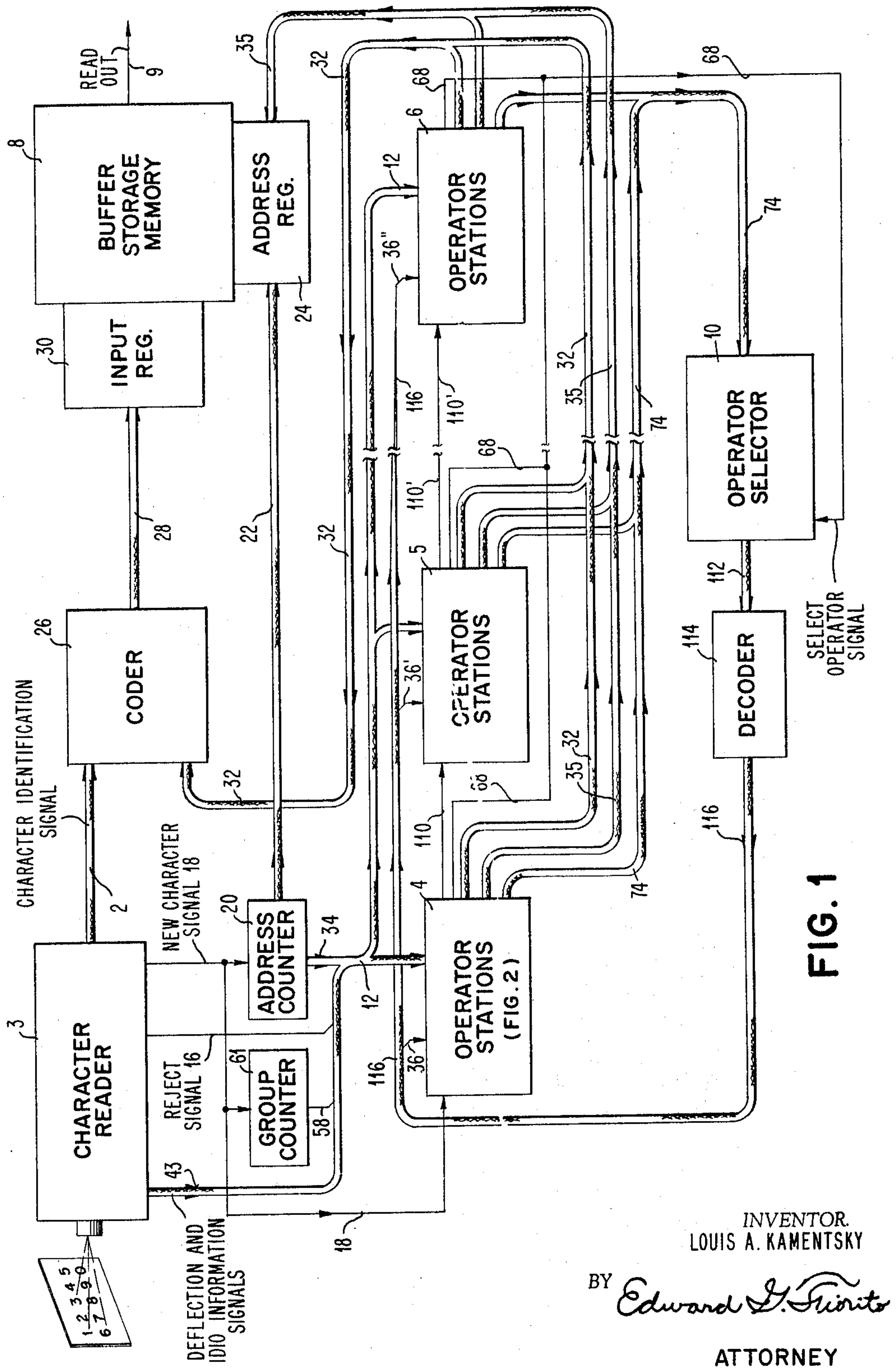
FIG. 1 is a block diagram of a character reading system embodying the present invention.

The system of FIG. 1 employs a character reader 3 which reads the characters presented for recognition and provides a character identification signal on a cable 2. Operator stations 4, 5 and 6 provide a means for assisting the character reader 3 in identifying characters which cannot be recognized by the reader 3. Identification signals from the character reader 3 and operator stations 4–6 are stored in a buffer storage memory 8, typically a core memory. The buffer storage memory 8 provides a means for interleaving the character identification signals from the reader 3 and operator stations 4–6 so that the signals may be read out on line 9 from the memory 8 in the same sequence in which they were presented to reader 3.

The workload is distributed to the operator stations 4–6 by an operator selector 10. The selector 10 couples the reader 3 to one of the stations 4–6 via a cable 12.

The character reader 3 may be any conventional type of character reader whose operation is to be improved by the present invention. Normally the character reader 3 provides a signal on cable 2 which identifies the character presented to the reader 3. For example, when the reader 3 indentifies numerical characters, ten lines would be included in the cable 2, one for each number 0 through 9. If the reader 3 cannot identify the characters presented for recognition a signal appears on a reject line 16. One example of a character reader providing a reject signal when a character cannot be recognized is shown in commonly assigned, co-pending application Serial No. 93,070, entitled "Specimen Identification Apparatus and Method." The reject signal may also be provided by auxiliary equipment employed to generate a reject signal after a sufficient time has elapsed for the reader to identify the character.

Each time a new character is presented to the reader for recognition a signal is provided on a line 18. According to the type of character reader 3 to be assisted by the present invention it may be preferable to provide a signal on line 18 each time a character has been either identified or rejected. The present invention performs in the same manner when the signal on line 18 appears either before the character reader operates on the character or after such operation.

An address counter 20 counts the number of new characters and provides an output signal on a cable 22. The address counter 20 may be any well-known counter having sufficient capacity to count the number of characters to be stored in the buffer memory 8. The output of the address counter 20 is supplied via a cable 22 to an address register 24. The address register 24 operates in a well-known manner with the buffer memory 8 to select the memory location in the buffer 8 at which information is to be stored.

Character identification signals from reader 3 are supplied via cable 2 to a coder 26. The coder 26 performs the function of converting the character identification signals from reader 3 into binary signals on a cable 28. For example, where the characters to be identified are in the form of decimal numbers, ten lines are present in cable 14, one line for each of the decimal numbers 0 through 9. The coder 26 determines which of the ten lines in cable 14 is activated and provides a four-bit binary signal on cable 28. For this example the coder acts as a decimal to binary converter in a manner well known in the prior art. An input register 30 accepts the character identification signals in binary form from cable 28 and inserts them into the buffer storage 8 at a memory location determined by the address signal in address register 24.

In operation if the character reader 3 is capable of reading all of the characters presented for recognition, then the character identification signals flow directly into the buffer storage memory 8 and are stored at memory locations determined by the sequence in which they are presented. However, when a character cannot be identified by the reader 3 a reject signal appears on line 16 initiating a sequence of events which ultimately results in a character identification signal appearing on a cable 32. The character identification signal on cable 32 is selected by one of the operators at stations 4–6. The coder 26 converts the character identification signals on cable 32 into a binary representation in the same manner as the signals on cable 2.

Address counter 20 supplies an output to a cable 34 which is a sub-assembly of the cable 12. The address of the rejected character is stored in one of the operator stations 4–6 so that when the character identification signal is supplied on cable 32, the address signal corresponding to the rejected character is supplied via a cable 35 to address register 24. The address signal of the rejected character, once placed in the address register 24, determines in which memory location the rejected character identification signal is to be stored. After the decoder 26 has converted the rejected character identification signal on cable 32 into the binary notation, the signal is supplied to input register 30 via cable 28 and then placed into the memory location in the buffer storage 8 selected by address register 24. Therefore the buffer storage memory 8 contains character identification signals in the same sequence as they were originally presented to the character reader regardless of whether the character identification signals were generated by the reader 3 or the operator stations 4–6. This follows directly from the fact that each character is assigned an address signal by the counter 20 which controls the memory location in the buffer storage 8 regardless of whether the identification is made immediately by character reader 3 or postponed until one of the operator stations 4–6 can make the determination.

The buffer storage memory 8 may be read out on line 9 to a tape storage for later use. Readout of the buffer storage memory 8 may be accomplished in any well known manner. For example the memory 8 may be completely emptied during a pause in the operation of the reader, when documents are changed at the input to the reader; or the buffer storage memory 8 may be read out a portion at a time in between signals from the coder 26. The details of the readout circuitry are not described herein since they may be supplied by those skilled in the art.

*Detailed description of operator stations*

Figure 2:
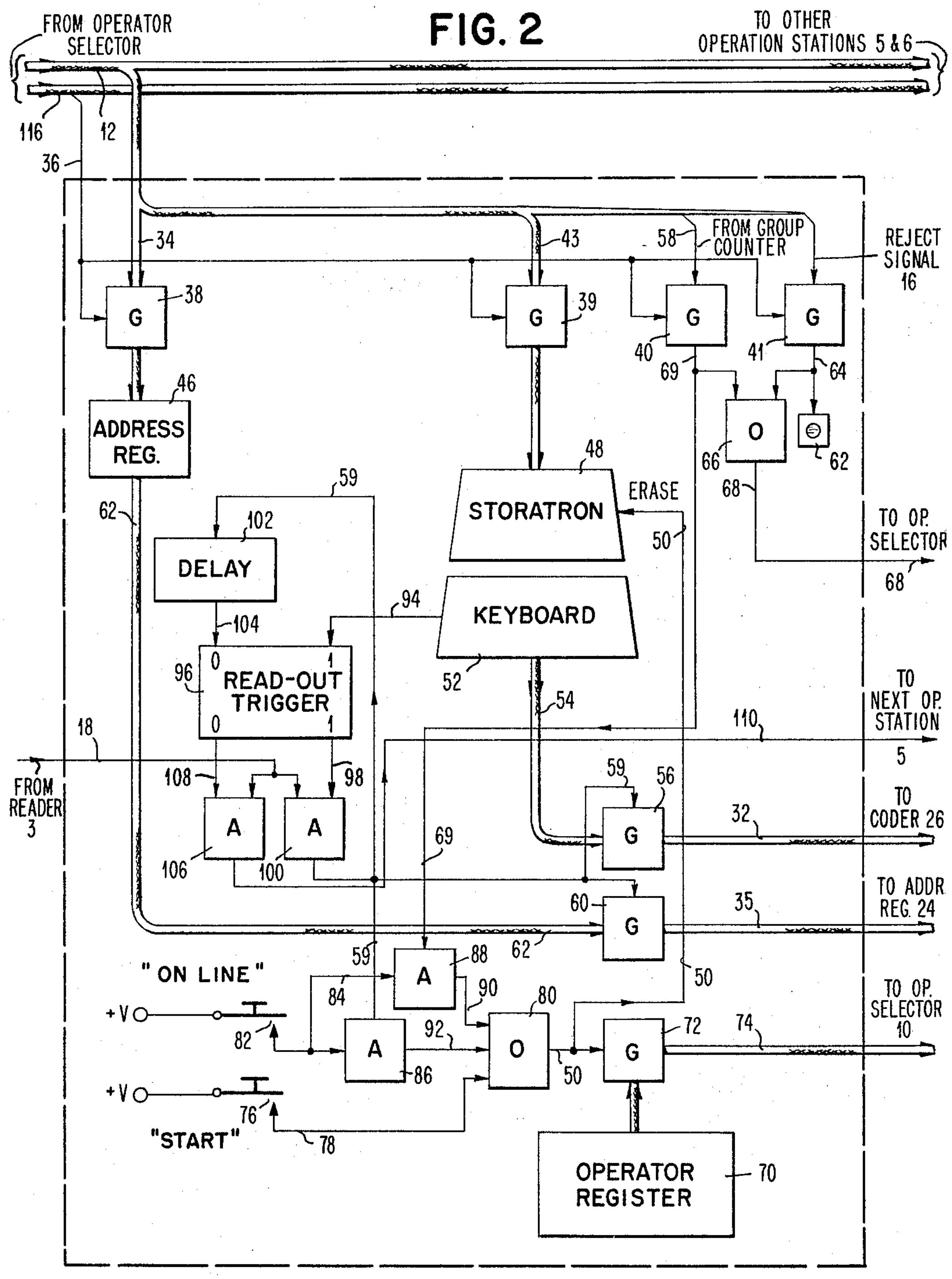
FIG. 2 is a block diagram of one of the operator stations shown in FIG. 1.

The details of the operator station 4 are shown in FIG. 2. The other operator stations contain similar equipment. The operator station is activated by a signal on a line 36 from the operator selector 10. The signal on line 36 enables gates 38, 39, 40 and 41. Gates 38 and 39 each contain a number of sub-elements, one for each of the lines in cables 34 and 43 respectively. Cable 34 is a sub-assembly of cable 12 and contains the same lines from the output of address counter 20. An address register 46 connected to gate 38 continuously stores the output of the address register 20 changing the signals stored in the register 46 each time the counter 20 advances to a new setting. When the signal on line 36 drops off, the last signal from address counter 20 passed through gate 38 is stored in the address register 46. As will be described below in the detailed description of the operator selector 10, the rejected character address signal is the last signal to pass through gate 38 so that the contents of the address register 46 represents the address of the rejected character.

The lines in cable 43 originate from the character reader 3 and contain the deflection and video information signals associated with the scanner employed in the character reader machine. These signals may also be derived from a separate scanner (not shown) provided it observes the same character as the reader 3. The deflection and video information signals are passed through gate 39 when line 36 is activated and are applied to a storatron 48.

The storatron 48 is primarily a cathode ray tube which operates in response to the deflection and video signals provided by the scanner within the character reader 3. The characters are stored on the face of the storatron 48. Various conventional devices may be employed to display the characters. However, one suitable device is the "Direct View Storage Tube" manufactured by the Allen B. Du Mont Laboratories, Inc., Clifton, N.J.

The display is stored on a face of the storatron until an erase signal is supplied on a line 50. The generation of the erase signal on line 50 will be described below. The operator may observe all of the characters presented to the character reader 3 during the interval when line 36 is activated. The particular character of interest to the operator is a rejected character which will be the last character to be presented on the face of the storatron.

The operator station 4, as well as the other stations 5 and 6, are provided with a keyboard 52 which may be set by an operator observing the rejected character on the face of the storatron 48. The keyboard 52 generates a character identification signal which is supplied to a cable 54 in response to manual operation by the operator. The character identification signals are supplied to the coder 26 via cable 32 when a gate 56 is activated. Gate 56 includes a number of sub-elements, one for each line in cable 54. The gate 56 is enabled by the signal on a line 59 the operation of which is described in the detailed description of the readout of the operator station below. The line 59 also enables a gate 60 which passes address signals from address register 46 via a cable 62 and cable 35 to the address register 24. Therefore when line 59 is activated the identification signals from keyboard 52 and the address signals from address register 46 are simultaneously sent to the coder 26 and address register 24 respectively.

The remaining two signals supplied to the operator station 4 and controlled by the signal on line 36 are reject signal 16 coming from character reader 3, and the signal on line 58 coming from a group counter 61 shown in FIG. 1. The group counter 61 accepts the new character signal 18 and provides the signal on line 58 after a predetermined number of new characters have been presented to the reader 3 for recognition. The group counter signal on line 58 ultimately cuts off the presentation of characters on the storatron 48 if a reject signal does not appear first upon line 16. Therefore the number of characters counted by the group counter 61 before cutting off the storatron 48 is determined by the capacity of the storatron 48. The details of the effect of the group counter signal on line 58 is reserved until the operation of the selector 10 is described in detail.

When the reject signal is passed through the gate 41, an indicator 62 is activated via line 64. Activation of indicator 62 alerts the operator to the fact that a character has been rejected. The signal on line 64 is also supplied to an OR gate 66 which provides a signal on a line 68 connected to operator selector 10. The other input leading to OR gate 66 is supplied by line 69 from the output of gate 40. Therefore whenever a group counter signal on line 58 or a reject signal on line 66 passes through gates 40 or 41 respectively the OR gate 66 provides a signal on line 69 to the operator selector 10. As will be described in more detail below the signal on line 68 notifies the operator selector 10 to discontinue the signal on line 36 and activate another one of the operator stations 5 or 6.

The operator station shown in FIG. 2 includes an operator register 70 which stores an identification number in binary form. The operator number stored in station 4 differs from the ones stored in the operator number registers of stations 5 and 6. The operator number is stored in binary notation and is passed through a gate 72 when a signal is present on line 50. The gate 72 includes a number of sub-elements one for each line coming from the operator register 70. The operator number is supplied via a cable 74 to the input of the operator selector 10.

There are three conditions which cause the operator number stored in register 70 to be supplied to the operator selector 10. The first occurs when the operator presses a start button 76. This causes a signal to be supplied via a line 78 to a three input OR gate 80. The OR gate 80 provides the enabling signal on line 50. The start button 76 returns to its normally open position after the operator joins the team of operators assisting the reader 3.

If the operator wishes to continuously assist the character reader 3 an "on line" switch 82 is closed. The switch 82 remains closed providing a signal via a line 84 to AND gates 86 and 88. AND gate 88 is supplied with a second input from line 69. As described above the line 69 is activated when the group counter 61 has completed counting a predetermined number of characters presented to the reader 3 for recognition. Therefore the second condition for supplying the operator number stored in register 70 to the selector 10 occurs when the group counter 61 shown in FIG. 1 supplies a signal, and the "on line" switch 82 is closed. In this second condition the operator is prepared to accept another assignment.

The third way in which the operator number stored in register 70 may be supplied to the operator selector 10 occurs when the line 59 is activated during read-out of the station 4 described below. The line 59 enables AND gate 86 when the "on line" switch 82 is closed.

*Read-out of operator stations*

Read-out of the character identification signal in the keyboard 52 must be accomplished at a time when no character identification signals are supplied by the character reader 3. Otherwise the coder 26 would be supplied with two character identification signals via cables 2 and 32 at the same time. In order to avoid this collision the keyboard 52 provides a signal on a line 94 whenever a character identification signal has been stored therein. The signal on line 94 sets a read-out trigger 96 into the one state. When the trigger 96 is in the one state a signal is provided on a line 98 which conditions one leg of an AND gate 100. The second signal applied to AND gate 100 is supplied by line 18 coming from character reader 3. The line 18 is activated each time a new character is presented to the reader 3 for recognition. Therefore at this time the character reader is supplying no identification signals on cable 2 since some delay must occur until the character reader can identify the new character presented. During this interval the operator stations 4–6 are read-out into the buffer memory 8.

AND gate 100 supplies a signal on line 59 when the read-out trigger 96 is set in the one state and a signal is supplied on line 18 from reader 3. The four events following activation of line 59 described above are summarized here. First, gate 60 is enabled allowing the address of the rejected character stored in address register 46 to be transferred to the address register 24 shown in FIG. 1. Second, gate 56 is enabled allowing the identification signal of the rejected character stored in keyboard 52 to be transferred to the coder 26. Third, AND gate 86 is enabled, provided the "on line" switch 82 is closed, resulting in the transfer of the operator number stored in register 70 to the operator selector 10. Fourth, the storatron 48 is erased in response to a signal on line 50 supplied by OR gate 80. Therefore the entire operator station has been cleared for a new assignment.

In addition to the four events summarized above, the trigger 96 is reset during read-out of the station 4. The signal on line 59 passes through a delay 102 and is applied to the reset input of trigger 96 via a line 104. The delay 102 is inserted in the circuit so that the trigger 96 is not reset before the signal on line 18 terminates. This insures that no spurious signals are passed through an AND gate 106. The AND gate 106 sends a signal to the next operator station 5 when there is no identification number stored in the keyboard 52. The AND gate 106 receives one input from line 18 and the other input from the zero state output from trigger 96 via a line 108.

When the read-out trigger 96 is in the zero state indicating that no rejected character identification signal is stored in the keyboard 52, a signal appears on line 108 enabling one input of AND gate 106. The second input to AND gate 106 is enabled when a signal is supplied on line 18. The AND gate 106 supplies a signal on line 110 connected to the next operator station 5. AND gates 100 and 106 within station 5 accept the signal on line 110. If the read-out trigger 96 in station 5 is set in the one state indicating that a rejected character identification signal is stored in the associated keyboard 52, then operator station 5 is read-out. If no rejected character identification signal is stored in station 5 then the signal originally started on line 18 from reader 3 passes through station 5 and is sent via a line 110' to interrogate the condition of the read-out trigger 96 in station 6.

*Detailed description of operator selector 10*

The operator selector 10 distributes the workload to the operator stations 4–6. Various types of selectors could be employed. For example a simple distributor might be advanced each time a new assignment is available for distribution. However such a simple distributor would not take into account all of the values involved in the problem of assisting the character reader 3. For example, one operator may not have completed the identification of a rejected character before such operator's turn came up again on the simple distributor. Also operators may leave or join the team so that the selector 10 must be flexible enough to adjust each time the number of stations 4–6 changes.

For these reasons it has been found that the preferred embodiment of the operator selector 10 is one which selects the operator stations 4–6 on a priority basis. That is the operator who finishes the assignment first is given an assignment prior to operators who subsequently finish their assignment. One embodiment of the operator selector 10 which performs such a function is shown in commonly assigned, co-pending application Serial No. 198,-239, entitled "Push-Down Memory." The operator selector 10 accepts the operator numbers supplied in binary form on cable 74 and stores them. The order in which the operator numbers are received depends upon the individual operation of each of the stations 4–6. As described above and summarized here there are three ways in which an operator number can be supplied to the selector 10. The first occurs when the start button 76 shown in FIG. 2 is pressed by the operator. The second occurs when the group counter 61 shown in FIG. 1 provides a signal after having counted a predetermined number of new characters presented to the reader 3 for recognition. The third condition occurs when the keyboard 52 is read out in response to a signal on line 18 from reader 3. When any one of these three events occur in one of the operator stations 4–6 the operator number stored in the associated register 70 is supplied to the input of the selector 10. The number is stored in the selector 10 and the associated operator station 4, 5, or 6 awaits the next assignment.

The output of the operator selector 10 is controlled by signals supplied on line 68. As was described above and summarized here, a signal is present on line 68 whenever one of the stations 4–6 having displaying characters receives either a signal from group counter 61, or a reject signal from line 16. When either of these events occur the operator selector 10 is requested to supply the next operator number to an output cable 112. The operator number supplied by selector 10 is always the number stored for the longest period of time within the selector 10 in accordance with the operation of the above application Serial No. 198,239. Once the number has been passed to the output cable 112 it is withdrawn from storage and will not be supplied again by the selector 10 unless it is reapplied to the input via cable 74. The detailed operation of selector 10 is shown and described in the above application Serial No. 198,239, and is not redescribed herein. The operator number on cable 112 is supplied to a decoder 114 which converts the binary form of the number into a plurality of output lines on a cable 116. The cable 116 includes lines 36, 36′ and 36″ connected to operator stations 4–6 respectively. The decoder 114 may be any well-known binary to decimal converter performing the reverse function of the decimal to binary coder 26 described above.

In operation if the operator selector 10 supplies an operator number corresponding to station 4, the decoder 114 supplies a signal on line 36 within cable 116. Station 4 is thereby coupled to the character reader 3 via cable 12. Station 4 receives signals from character reader 3 displaying the characters presented to the reader 3 upon the face of the storatron 48 within station 4. This operation continues until either a signal from the group counter 61 appears, or a reject signal appears on line 16. As described above either of these last mentioned signals create a signal on line 68 directing the operator selector 10 to select another operator station for displaying the new characters presented to the reader 3. The reject signal on line 16 does not erase the storatron 48 as does the group counter signal on line 58. All of the characters presented to the storatron 48, including the last rejected character must remain on the face of the storatron 48 so that the operator can again identify the rejected character and operate the keyboard 52. Eventually the storatron 48 is erased when the keyboard is read-out in response to a signal on line 18 from the reader 3. As described above the signal on line 18 passes through AND gate 100 when the read-out trigger 96 is in the one state and follows the path through line 59, AND gate 86, OR gate 80 and line 50 to erase the storatron 48.

Although the embodiment of the invention shown in FIG. 1 employs three operator stations 4–6 the number of operator stations may be increased as shown by the broken cables between stations 5 and 6. The number of stations may also be decreased down to just one where only infrequent rejection of characters is anticipated. For this single operator station embodiment the operator selector 10 along with associated equipment can be eliminated. In the event that a character is rejected when all of the operator reader stations are engaged in assisting the character reader 3, several alternatives exist for remedying the situation. Means may be provided for stopping the entire system, or for rejecting the entire document since an excess of rejected characters appears therein.

Another modification to the illustrated embodiment can be made by modifying the manner in which the image is located for viewing by the operator. The rejected character may be underscored on the face of the storatron 48, instead of stopping the presentation of characters when a rejected signal occurs. Still another manner of presenting the image of the rejected character is to mark or underscore the document instead of the face of the storatron 48 at the location of the rejected character presented to the reader 3 for recognition. This latter manner of locating the image would require that the operator be in direct visual contact with the document containing the rejected character.

An additional modification of the embodiment disclosed can be made by substituting other means for addressing the characters presented to the reader 3 replacing the counter 20 shown in FIG. 1. The addressing means need not provide a progressively increasing signal such as that provided by the usual counter, but may provide any random sequence of signals so long as each signal assigned to the characters can be identified and distinguished by the address register 24 so that a different memory location within the buffer storage 8 is reserved for each character. Read-out of the buffer 8 may be more desirable in some sequence other than in the sequence in which the characters were originally presented.

Still another modification may be made effecting read-out of the operator stations in response to the presence of a character identification signal on cable 2 instead of in response to a new character signal on line 18. Since the object is to effect read-out whenever the character reader 3 is not providing a character identification signal, a delay could be inserted between cable 2 and the input to the operator station 4 so that the coder 26 would not receive simultaneous inputs on cables 32 and 2.

Further, it may be necessary in applying the present invention to some character readers to provide additional interface equipment between the reader 3 and the operator stations 4–6. Such equipment is pulse shapers, delays, timing clocks, etc. may be called for dependent upon the individual circuitry within the reader 3. Design details of this nature are familiar to those skilled in the art and are not presented herein.

In summary a system has been described which addresses each character presented for recognituon. When a character cannot be recognized, the address of the rejected character along with an image of the rejected character, is presented to an operator. The operator assists the system by providing proper identification of the rejected character. The operator produced signals are interleaved with the character identification signals from the system at the proper location.

While the invention has been particularly shown and described with reference to a preferred embodiment thereof it will be understood by those skilled in the art that the foregoing and other changes in form and details may be made therein without departing from the spirit and scope of the invention.

I claim:

1. In a character reading system wherein a character reader provides an identification signal for each character recognized and a rejection signal when a rejected character cannot be recognized, the combination with said reader of:

addressing means for providing a corresponding address signal for each character presented to said reader for recognition;

an operator station including, address storage means connected to receive said address and rejection signals for storing the address signal of a rejected character in response to a corresponding rejection signal, means for locating images of rejected characters, and keyboard means for providing an identification signal in response to manual operation of said keyboard means; and storage means including a plurality of memory locations for storing the identification signals from said character reader at memory locations determined by a corresponding address signal from said addressing means, and for storing the identification signal from said keyboard means at a memory location determined by the corresponding address signal stored in said address storage means.

2. In a character reading system wherein a character reader provides an identification signal for each character recognized and a rejection signal when a rejected character cannot be recognized, the combination with said reader of:

an address counter connected to count the number of characters presented to said reader, the output of said address counter providing a corresponding address signal for each character presented to said reader;

an operator station including, an address storage register connected to receive the output of said address counter and store the address signal of a rejected character in response to a corresponding rejection signal, means for locating images of rejected characters, and keyboard means for providing an identification signal in response to manual operation of said keyboard means; and storage means including a plurality of memory locations for storing the identification signals from said character reader at memory locations determined by the corresponding address signals from said address counter, and for storing the identification signal from said keyboard means at memory locations determined by the corresponding address signal stored in said address storage register.

3. In a character reading system wherein a character reader provides an identification signal for each character recognized and a rejection signal when a rejected character cannot be recognized, the combination with said reader of:

addressing means for providing a corresponding address signal for each character presented to said character reader for recognition;

an operator station including, address storage means connected to receive said address and rejection signals for storing the address signal of a rejected character in response to a corresponding rejection signal, means for locating images of rejected characters, keyboard means for storing a character identification signal selected by manual operation of said keyboard means, and readout means associated with said keyboard means for reading out the identification signal stored in said keyboard means and the address signal stored in said address storage means at a time other than when said reader provides an identification signal; and storage means including a plurality of memory locations for storing the identification signals from said character reader at memory locations determined by the corresponding address signals from said addressing means, and for storing the identification signal from said keyboard means at a memory location determined by the corresponding address signal stored in said address storage means.

4. In a character reading system wherein a character reader provides an identification signal for each character recognized and a rejection signal when a rejected character cannot be recognized, the combination with said reader of:

an address counter connected to count the number of characters presented to said reader, the output of said address counter providing a corresponding address signal for each character presented to said reader;

an operator station including, an address storage register connected to receive the output of said address counter for storing the address signal of a rejected character in response to a corresponding rejection signal, means for locating images of rejected characters, keyboard means for storing a character identification signal in response to manual operation of said keyboard means, readout means associated with said keyboard means for reading out the identification signal stored in said keyboard means and the address signal stored in said address register at a time other than when said reader provides an identification signal; and storage means including a plurality of memory locations for storing the identification signals from said character reader at memory locations determined by the corresponding address signals from said address counter, and for storing the identification signals read out of said keyboard means at memory locations determined by the address signal stored in said storage register.

5. In a character reading system wherein a character reader provides an identification signal for each character recognized and a rejection signal when a rejected character cannot be recognized, the combination with said reader of:

addressing means for providing a corresponding address signal for each character presented to said character reader for recognition;

a plurality of operator stations each one including, address storage means capable of storing address signals from said addressing means, means for locating images of rejected characters and keyboard means for providing an identification signal in response to manual operation of said keyboard means;

operator selector means for effecting the storage of the address signal for a rejected character in the storage means of one of said plurality of stations in response to said rejection signal; and buffer storage means for storing the identification signals from said character reader at memory locations determined by the corresponding address signals from said addressing means, and for storing the identification signals from said keyboard means at memory locations determined by the address signals stored in the associated address storage means.

6. In a character reading system wherein a character reader provides an identification signal for each character recognized and a rejection signal when a rejected character cannot be recognized, the combination with said reader of:

an address counter connected to count the number of characters presented to said reader, the output of said address counter providing a corresponding address signal for each character presented to said reader;

a plurality of operator stations each one including, an address storage register connected to receive the output of said address counter and capable of storing the last address signal supplied to said storage register, means for locating images of rejected characters in response to said rejection signal, and keyboard means for providing an identification signal in response to manual operation of said keyboard means;

operator selector means for effecting the storage of the address signal of a rejected character in the address storage register of one of said plurality of operator stations in response to said rejection signal; and storage means including a plurality of memory locations for storing the identification signals from said character reader at memory locations determined by the corresponding address signals from said address counter, and for storing the identification signal from said keyboard means at memory locations determined by the corresponding address signal stored in the associated address storage register.

7. In a character reading system wherein a character reader provides an indentification signal for each character recognized and a rejection signal when a rejected character cannot be recognized, the combination with said reader of:

an address counter connected to count the number of characters presented to said reader, the output of said address counter providing a corresponding address signal for each character presented to said reader;

a plurality of operator stations each one including, an address storage register connected to receive the output of said address counter for storing the last address signal supplied to said storage register, means for locating images of the rejected characters in response to said rejection signal, keyboard means for storing a character identification signal selected by manual operation thereof, and readout means associated with said keyboard means for reading out the identification signal stored in said keyboard means and the address signal stored in said address register at a time other than when said reader provides an identification signal;

operator selector means for effecting the storage of the address signal of a rejected character in the address storage register of one of said plurality of operator stations in response to said rejection signal; and storage means including a plurality of memory locations for storing the identification signals from said reader at memory locations determined by the corresponding address signals for said address counter, and storing the identification signals read out of said keyboard means at memory locations determined by the corresponding address signals stored in the associated storage register.

8. In a character reading system wherein a character reader provides an identification signal for each character recognized and a rejection signal when a rejected character cannot be recognized, the combination with said reader of:

addressing means for providing a corresponding address signal for each character presented to said character reader for recognition;

a plurality of operator stations each one including, address storage means capable of receiving the output of said addressing means for storing the address signal of a rejected character, means for locating images of rejected characters in response to said rejection signal, and keyboard means for providing a character identification signal in response to manual operation of said keyboard means, and an operator register capable of providing an operator signal distinguishable from the operator signals of all other stations;

operator selector means for coupling said address signals to said plurality of stations one by one in a sequential order, said selector means including, a memory capable of storing all of said operator signals supplied thereto, and capable of providing said operator signals one by one in a sequential order beginning with the first operator signal supplied thereto and ending with the last operator signal supplied thereto, memory input means associated with each of said stations for supplying said memory with the operator signal from stations providing an identification signal from the associated keyboard means, memory output control means for initiating an output from said memory each time a reject signal is provided by said reader, and decoder means for distinguishing the operator signals provided by said memory and for coupling said address signals to the station corresponding to the operator signal provided by said memory; and storage means including a plurality of memory locations for storing the identification signals from said reader at memory locations determined by the corresponding address signals from said addressing means, and for storing the identification signals from said keyboard means at memory locations determined by the address signal stored in the associated address storage means.

9. In a character reading system wherein a character reader provides an identification signal for each character recognized and a rejection signal when a rejected character cannot be recognized, the combination with said reader of:

addressing means for providing a corresponding address signal for each character presented to said character reader for recognition;

a plurality of operator stations each one including, address storage means capable of receiving the address signals from said addressing means for storing the address signals of defective characters, means for locating images of rejected characters in response to said rejection signal, keyboard means for storing a character identification signal selected by manual operation thereof, read-out means associated with said keyboard means for reading out the identification signal stored in said keyboard means and the address signal stored in said address register at a time other than when said reader provides an identification signal, and an operator register capable of providing an operator signal distinguishable from the operator signals of all other stations;

operator selector means for coupling said address signals to said plurality of stations one by one in a sequential order, said selector means including, a memory capable of storing all of said operator signals supplied thereto, and capable of providing said operator signals one by one in a sequential order beginning with the first operator signal supplied thereto and ending with the last operator signal supplied thereto, memory input means associated with each of said stations for supplying said memory with the operator signal from stations reading out character identification signals from said keyboard means, memory output control means for initiating an output from said memory each time a reject signal is provided by said reader, and decoder means for distinguishing the operator signals provided by said memory and for coupling said address signals to the station corresponding to the signal provided by said memory; and storage means including a plurality of memory locations for storing the identification signals from said reader at memory locations determined by the corresponding address signals from said addressing means, and for storing the identification signals read out of said keyboard means at memory locations determined by the corresponding address signal stored in the associated storage means.

10. In a character reading system wherein a character reader provides an identification signal for each character recognized and a rejection signal when a rejected character cannot be recognized, the combination with said reader of:

addressing means for providing a corresponding address signal for each character presented to said character reader for recognition;

a group counter connected to count the number of characters presented to said reader and provide a group signal each time a predetermined number of characters is presented;

a plurality of operator stations each one including, address storage means capable of receiving the address signals from said addressing means for storing the address signals of rejected characters, means for locating images of rejected characters in response to rejection signals, keyboard means for providing an identification signal in response to manual operation of said keyboard means, and an operator register capable of providing an operator signal distinguishable from the operator signals of all other stations;

operator selector means for coupling said address signals to said plurality of stations one by one in a sequential order, said selector means including, a memory capable of storing all of said operator signals supplied thereto, and capable of providing said operator signals one by one in a sequential order beginning with the first operator signal supplied thereto and ending with the last operator signal supplied thereto, memory input means associated with each of said stations for supplying said memory with the operator signal from stations receiving said group signal, and for supplying said memory with the operator signal from stations reading out character identification signals, memory output control means for initiating an output from said memory each time a group signal or a reject signal is provided, and decoder means for distinguishing the operator signals provided by said memory and for coupling said address signals to the station corresponding to the operator signal provided by said memory; and buffer storage means including a plurality of memory locations for storing the identification signals from said reader at memory locations determined by the corresponding address signals from said addressing means, and for storing the identification signals provided by said keyboard means at memory locations determined by the corresponding address signal stored in the associated storage means.

11. In a character reading system wherein a character reader provides an identification signal for each character recognized and a rejection signal when a rejected character cannot be recognized, the combination with said reader of:

an address counter connected to count the number of characters presented to said reader, the output of said address counter providing a corresponding address signal for each character presented to said reader;

a group counter connected to count the number of characters presented to said reader and provide a group signal each time a predetermined number of characters is presented;

a plurality of operator stations each one including, an address storage register connected to receive the output of said address counter and capable of storing the last address signal supplied to said storage register, display means for presenting images of rejected characters in response to said rejection signal, keyboard means for storing a character identification signal selected by manual operation thereof, readout means associated with said keyboard means for reading out the identification signal stored in said keyboard means and the address signal stored in said address register at a time other than when said reader provides an identification signal, and an operator register capable of providing an operator signal distinguishable from the operator signals of all other stations;

operator selector means for coupling said address signals to said plurality of stations one by one in a sequential order, said selector means including, a memory capable of storing all of said operator signals supplied thereto, and capable of providing said operator signals one by one in a sequential order beginning with the first operator signal supplied thereto and ending with the last operator signal supplied thereto, memory input means associated with each of said stations for supplying said memory with the operator signal from stations receiving said group signal, for supplying said memory with the operator signal from stations reading out character identification signals, and for supplying said memory with the operator signal from stations in response to manual activation of the associated operator register, memory output control means for initiating an output from said memory each time a group signal or a reject signal is provided, and decoder means for distinguishing the operator signals provided by said memory and for coupling said address signals to the station corresponding to the operator signal provided by said memory; and buffer storage means including a plurality of locations for storing the identification signals from said reader at memory locations determined by the corresponding address signals from said address counter, and for storing the identification signals read out of said keyboard means at memory locations determined by the corresponding address signals stored in the associated storage register.

References Cited by the Examiner

UNITED STATES PATENTS 3,181,119 4/1965 Rabinow ---------- 340—146.3

MAYNARD R. WILBUR, *Primary Examiner.*

DARYL W. COOK, *Examiner.*

J. S. SMITH, *Assistant Examiner.*